US006944869B2

(12) United States Patent
Ho

(10) Patent No.: US 6,944,869 B2
(45) Date of Patent: Sep. 13, 2005

(54) OPTICAL DRIVE

(76) Inventor: Ming-Chiao Ho, P.O. Box No. 6-57, Junghe, Taipei 235 (TW)

( * ) Notice: Subject to any disclaimer, the term of this patent is extended or adjusted under 35 U.S.C. 154(b) by 88 days.

(21) Appl. No.: 10/624,468

(22) Filed: Jul. 23, 2003

(65) Prior Publication Data

US 2005/0022214 A1 Jan. 27, 2005

(51) Int. Cl.[7] .......... G11B 33/02
(52) U.S. Cl. .......... 720/600; 369/75.11
(58) Field of Search .......... 720/600, 601, 720/615; 369/75.11, 75.21, 77.11, 77.21; 361/684, 679, 823

(56) References Cited

U.S. PATENT DOCUMENTS 6,301,098 B1 * 10/2001 Kim .......... 361/680
6,523,083 B1 * 2/2003 Lin et al. .......... 711/103
6,608,707 B1 * 8/2003 Han .......... 358/497
6,692,361 B1 * 2/2004 Itskov .......... 463/43
6,741,454 B2 * 5/2004 Tozune et al. .......... 361/679
2003/0067742 A1 * 4/2003 Su et al. .......... 361/684
2004/0199687 A1 * 10/2004 Hsu et al. .......... 710/74

* cited by examiner

*Primary Examiner*—Allen Cao
(74) *Attorney, Agent, or Firm*—Troxell Law Office, PLLC

(57) ABSTRACT

A compact disk player includes a housing, an optical drive and a flash card reader. The housing has an internal chamber for accommodating the compact disk drive and the flash card reader, and a panel provided with a plurality of apertures. One of the apertures is for allowing a compact holder of the compact disk drive to pass in and out, whereas the other apertures are correspondingly provided with driving devices for reading from and writing to Memory Stick, CompactFlash, SecureDigital, MultiMedia, Smart Media, Extreme Digital, and PCMCIA cards. Using the above structure disposing the flash card reader and the optical drive in the same housing, materials required are decreased, occupied space is significantly reduced, and production cost is also lowered.

3 Claims, 3 Drawing Sheets

OPTICAL DRIVE

BACKGROUND OF THE INVENTION (a) Field of the Invention

The invention relates to a compact disk player, and more particularly, to a compact disk player providing accommodation for a flash card reader.

(b) Description of the Prior Art

A structure of a common optical drive generally comprises a housing and a compact disk drive, so as to form a so-called internally connected 5.25-inch optical drive as shown in FIG. 1. The housing includes a panel, which is provided with control switches electrically connected with the compact disk drive, and the control switches are operated for driving the compact disk drive in the housing. An ordinary panel is 14.8 cm in width, 4 cm in height, and 16.5 cm or 20.5 cm in length. In fact, a thickness of the compact disk drive is merely a half of that of the panel. In other words, the optical drive occupies only a half of a volume of the housing, and remaining space of the housing is for accommodating electric elements such as circuit boards and switches. However, these electric elements take up less than a half of the remaining space. It is apparent from the above that current compact disk players have shortcomings as having excessive volumes and occupying large spaces. In addition, redundant volumes of housings further increase material and production costs.

Considering an internally connected 3.5-inch card reader generally comprising a housing and a flash card reader. The housing has a panel disposed with control switches electrically connected with the flash card reader, and the control switches are operated for driving the flash card reader in the housing. The panel is usually 10.1 cm in width, 2.5 cm in height, and 13 cm in length. In fact, a total volume of the flash card reader and controller circuit boards thereof is far smaller than those of the panel and the housing. To be more exact, the total volume of the former only occupies a quarter of an internal volume of the housing. It is noted from the above that current internally connected 3.5-inch card readers have shortcomings as having excessive volumes and occupying large spaces. In addition, redundant volumes of housings further increase material and production costs.

Furthermore, consumers are obligated to purchase optical drives and card readers separately. Inconvenience regarding to purchasing and portability are caused, and money spent sums up to great amounts as well. However, suppose the conventional compact disk player and card reader are simultaneously disposed in a computer host, insertion slots namely a 5.25-inch slot and a 3.5-inch slot become necessary preoccupied, and unreduced volume and weight of the host are yet resulted.

SUMMARY OF THE INVENTION

Therefore, in the view of the shortcomings of the prior art, the primary object of the invention is to provide an optical drive capable of accommodating a flash card reader, thereby effectively decreasing materials required and lowering production cost thereof.

The secondary object of the invention is to provide a compact disk player combined with a compact flash drive, thereby reducing occupied space and thus cutting a volume of a computer host.

The other object of the invention is to provide an optical combined with a flash card reader, thereby lowering purchasing expenses of consumers as well as offering easy portability.

DETAILED DESCRIPTION OF THE PREFERRED EMBODIMENTS

To better understand the characteristics, functions and objects of the invention, detailed descriptions shall be given with the accompanying drawings hereunder.

Figure 1:
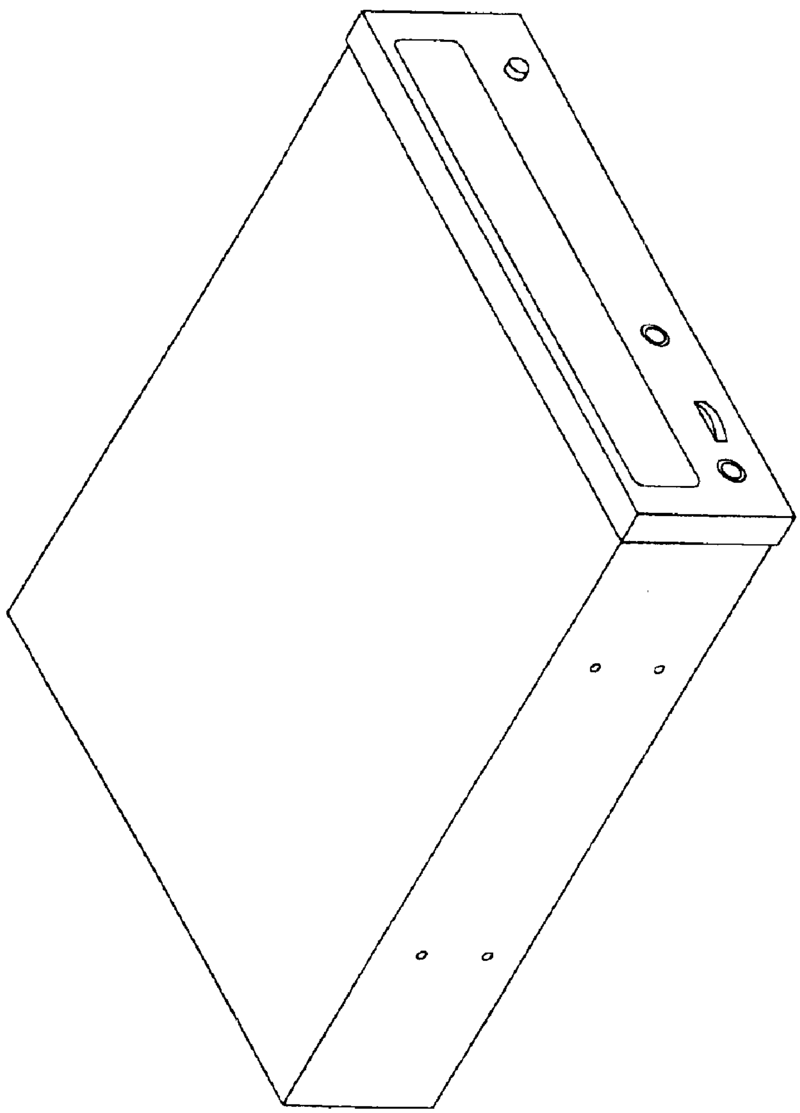
FIG. 1 shows a conventional schematic view of a prior art.
Figure 2:
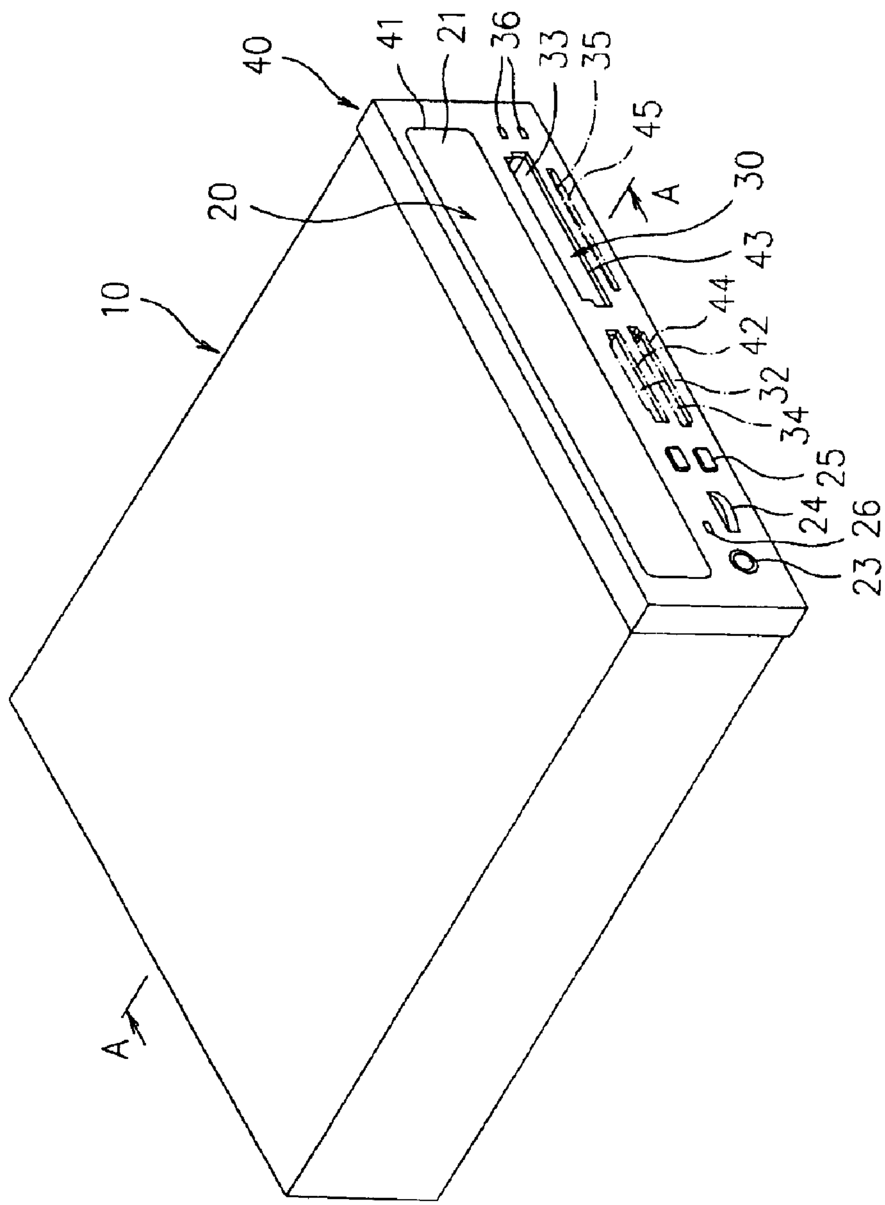
FIG. 2 shows an elevational view of a preferred embodiment according to the invention.
Figure 3:
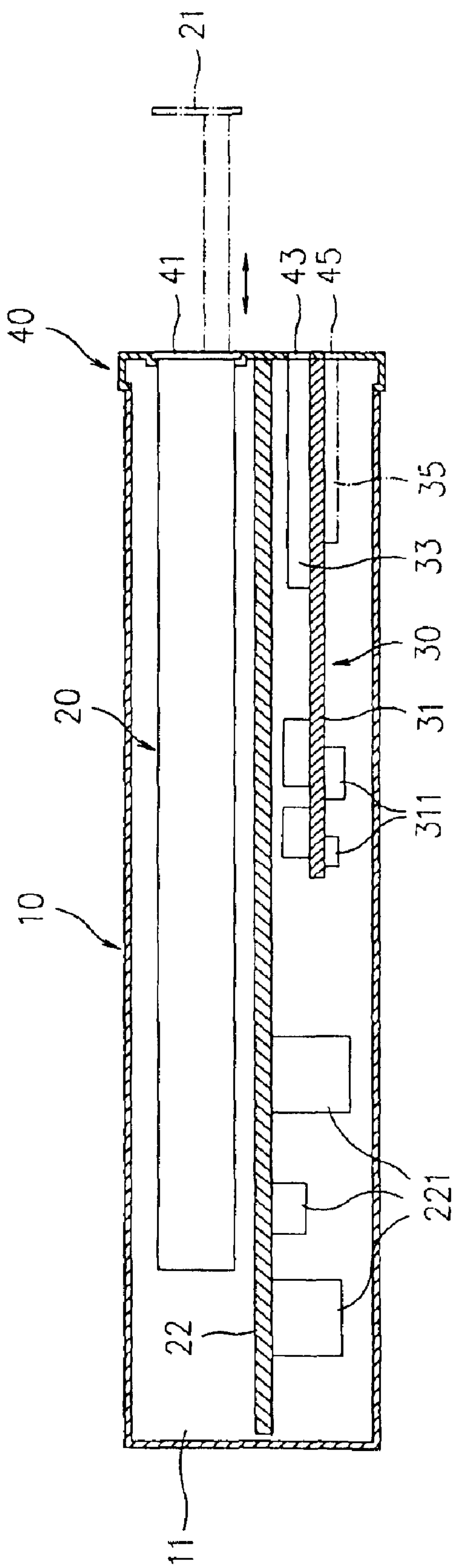
FIG. 3 shows a sectional schematic view of FIG. 1 along A—A.

Referring to FIGS. 2 and 3, an optical drive according to the invention comprises a housing 10, a compact disk drive 20 and a compact flash drive 30.

The housing has an internal chamber 11 for accommodating the compact disk drive 20 and the compact flash drive 30. The compact disk drive 20 is disposed at a top portion of the internal chamber 11, whereas the compact flash drive 30 is disposed below the compact disk drive 20 in the internal chamber 11 of the housing 10.

The housing 10 has a panel 40 provided with a plurality of apertures 41 and 43. The aperture 41 is for allowing a compact disk holder of the compact disk drive 20 for pass in and out. The aperture 43 is for uses of a device driving various MS/CF/MD/SD/MMC/SM/MD/XD/PCMCIA cards, and arrangements thereof (32, 34 and 35, for example) may be provided in remaining space according to requirements. The compact disk drive 20 has a circuit control board 22 provided with controlling electronic components 221. To adapt to the compact flash drive 30 disposed below the compact disk drive 20, the controlling electronic components 221 may be disposed at a bottom rear portion of the circuit control board 22, or electronic components having smaller volumes may be adopted.

At a position corresponding to the aperture 43, the flash card reader 30 is provided with a driving device 33 for MS/CF/MD/SD/MMC/SM/MD/XD/PCMCIA cards, and the aperture 43 are provided based upon type and quantity of the driving device 33. In addition, the flash card reader 30 similarly has a control circuit board 31 provided with controlling electronic components 311. Volumes of these electronic components 311 are not at all large, and therefore difficulties regarding designing are not incurred.

Other coordinated components such as earphone sockets 23, a volume tuner 24, a control button 25, an indication lamp 26, an indication lamp 36 for indicating operations of the compact flash drive 30 are arranged at other appropriate positions on the panel 40.

Conclusive from the above, the housing of the compact disk player according to the invention is capable of accommodating a compact flash card reader, and thus effectively reduces materials and lowering production cost. Moreover, the invention has a reduced volume for easy portability, and also offers economical values by decreasing purchasing expenses for consumers. It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. An optical drive apparatus for a plurality of flash cards comprising:

a) a housing having an internal chamber and having a plurality of apertures including a plurality of flash card apertures;

b) an optical drive located in the internal chamber reading from and writing to optical media; and c) a compact flash drive having:

i) a plurality of electronic components;

ii) a circuit board controlling the plurality of electronic components; and iii) a plurality of card driving devices located on the circuit board, each of the plurality of card driving devices aligning with one of the plurality of flash card apertures and selectively driving one of the plurality of flash cards, wherein the circuit board being located between at least two of the plurality of card driving devices.

2. The optical drive apparatus according to claim 1, wherein the plurality of flash cards are selected from a group of flash cards consisting of Memory Stick, Compact Flash, Secure Digital, Multi Media, Smart Media, Extreme Digital, PCMCIA, and any combination thereof.

3. The optical drive apparatus according to claim 1, wherein the optical drive includes a compact disk holder aligning with one of the plurality of apertures and being movable between open and closed positions therein.

* * * * *